United States Patent [19]
Laboure et al.

[11] Patent Number: 5,720,449
[45] Date of Patent: Feb. 24, 1998

[54] THRUST REVERSER WITH DOORS FOR AIRCRAFT ENGINE, EQUIPPED WITH SAFETY SYSTEMS PREVENTING THE UNTIMELY OPENING OF THE DOORS

[75] Inventors: Bernard Laboure, Velizy; Robert R. Standish, Gazeran, both of France

[73] Assignee: Societe de Construction des Avions Hurel-Dubois, Meudon La Foret, France

[21] Appl. No.: 638,595

[22] Filed: Apr. 29, 1996

Related U.S. Application Data

[63] Continuation-in-part of Ser. No. 339,564, Nov. 15, 1994, abandoned.

[30] Foreign Application Priority Data

Nov. 19, 1993 [FR] France ................... 93 13835

[51] Int. Cl.⁶ ............................................. F02K 1/70
[52] U.S. Cl. ........................ 244/110 B; 239/265.23; 60/226.2
[58] Field of Search ............... 244/110 B, 129.4, 244/129.5; 60/226 A, 229, 230; 292/129, 101, 121; 239/265.23

[56] References Cited

U.S. PATENT DOCUMENTS

| | | |
|---|---|---|
| 1,016,422 | 2/1912 | Lauritsen ................. 292/121 |
| 3,600,023 | 8/1971 | Gudde . |
| 3,752,519 | 8/1973 | Nordell et al. ............. 292/129 |
| 4,030,687 | 6/1977 | Hapke . |
| 4,266,816 | 5/1981 | Mukai et al. ............... 292/129 |
| 4,424,669 | 1/1984 | Fage . |
| 4,437,783 | 3/1984 | Halin et al. . |
| 4,637,642 | 1/1987 | Stoecker .................. 292/129 |
| 4,801,112 | 1/1989 | Fournier et al. . |
| 4,960,243 | 10/1990 | Dubois et al. .............. 244/110 B |
| 5,192,023 | 3/1993 | Fage et al. . |
| 5,209,057 | 5/1993 | Remlaouli ................. 244/110 B |

Primary Examiner—Andres Kashnikow
Assistant Examiner—Tien Dinh
Attorney, Agent, or Firm—Young & Thompson

[57] ABSTRACT

A thrust reverser with pivoting doors for a jet aircraft engine, with a system for security against in-flight deployment of a thrust reverser. The system has two independent locking assemblies, the first being a primary lock and the second being a safety lock that is positioned away from the first lock to avoid damage from a ruptured piece of the engine turbine disk. The first lock is hydraulically controlled and the second lock is electrically controlled and entirely independent, thus assuring an in-flight inadvertent deployment will not occur as a result from failures, faulty commands or inadequate maintenance.

17 Claims, 5 Drawing Sheets

THRUST REVERSER WITH DOORS FOR AIRCRAFT ENGINE, EQUIPPED WITH SAFETY SYSTEMS PREVENTING THE UNTIMELY OPENING OF THE DOORS

This is a continuation-in-part application of U.S. Ser. No. 08/339 564 filed on Nov. 15, 1994, now abandonded.

BACKGROUND OF THE INVENTION

1. Field of the Invention

The present invention relates to thrust reverser installations with doors for aircraft engine of the jet type and more particularly to installations including safety systems preventing the inadvertent deployment of the reverser doors, especially while the aircraft is in cruise flight.

2. Description of the Related Art

It is known that safety requirements impose the provision of solutions which must protect against incidents, even highly improbable incidents, which may occur during flight. This is the case in particular for reversers with doors whose inadvertent deployment in cruise flight must mandatorily be prevented. To this end, safety systems for the doors have already been proposed in French Patent No. 2,683,860 filed on Nov. 14, 1991 under No. 91 14011 in the name of the Assignee, as well as in U.S. Pat. No. 5,192,023 Fage et al, U.S. Pat. No. 4,030,687 Hapke, U.S. Pat. No. 3,600,023 Gudde and U.S. Pat. No. 4,437,783 Halin et al.

For structural reasons, these prior art safety systems, consisting of primary locks, are located in one and the same plane transverse to the axis of the engine. Present day safety regulations require that, in the event of a rotating piece of the engine, for example a turbine disc, detaching and damaging the outer fairing of the engine (creating a tear therein, for example), such an incident should nevertheless have no effect on the reverser doors being kept in the non-obstructing position. If, however, the rotating piece which, through the effect of centrifugal force has a substantially radial path, is thrown substantially into the transverse plane containing the safety systems, the risk of these being damaged, if not destroyed, therefore no longer fulfilling their function and allowing the untimely opening of the doors, is substantial.

SUMMARY OF THE INVENTION

The present invention proposes a simple solution to such a situation which practically eliminates any risk of inadvertent deployment of the doors in the event of an incident.

Although it can be extended to any type of reverser with doors, the invention applies particularly to thrust reverser installations comprising a series of pivoting doors articulated about pivots in a stationary structure of a fairing surrounding the engine more or less concentrically with the longitudinal axis of said engine, the doors being capable of pivoting, under the action of a control actuator, between a non-obstructing stowed position in which they close off openings made in the stationary structure of the fairing, and a deployed position in which they project radially outward from the fairing, freeing the openings via which the flow of propulsive gas may be deflected radially outward. An installation of this type according to the invention includes a door safety system made up, for each door, of at least two independent locks, each made of a first and of a second elements which are mutually and releasably engageable and which are mounted respectively on the stationary structure of the fairing and a corresponding part of the door, the two locks being separated from one another in the direction of the longitudinal axis of the engine and being associated respectively with systems for controlling the deployment and stowing of the doors, the systems being independent of one another.

By virtue of the locks being set out in two distinct and separated transverse planes, any risk of simultaneous damage to both locks of the safety system is practically eliminated.

In the case of the doors and the openings in the fairing in which they are housed having a somewhat rectangular overall shape, the two locks will be located respectively on two adjacent sides of each opening in the fairing. When the stationary fairing structure comprises an upstream (with respect to the direction of flow of the gases) annular frame and longitudinal spars respectively delimiting the upstream and lateral edges of the openings in the fairing, one of the locks, referred to as the primary or upstream lock, has its first lock element advantageously mounted on the upstream annular frame and its second lock element provided on the upstream edge of the door, while the other lock, referred to as the safety or lateral lock, has its first lock element mounted on a longitudinal spar and its second lock element is formed in the lateral edge of the door.

In order to keep the door sufficiently rigid and avoid excessive loads on the lateral or safety lock in the event of the upstream or primary lock being damaged, the safety lock first element mounted on the spar will be situated in the space lying between the door pivot, housed in said spar, and the upstream annular frame and, for preference, the distance lying between the safety lock first element and the upstream frame will be less than, or equal to, half the distance between the upstream frame and the door pivot. It is, however, appropriate for the lateral or safety lock not to be too close to the upstream frame in order to avoid it being reached by the rupture of a turbine disc which might damage the upstream or primary lock. This is why it will be required that the lateral or safety lock to be situated at a distance from the upstream frame lying between half and a quarter of the distance between the upstream frame and the door pivot.

The safety lock second element associated with the door is situated on the lateral door edge at a distance from the upstream edge of the door which is equal to, or less than, half the distance between the upstream door edge and the door pivot.

For preference, the safety lock second element is situated at a distance from the upstream door edge which lies between half and a quarter of the distance between the upstream edge and the door pivot.

In a preferred embodiment, the safety lock first element, mounted on the fairing spar, has the shape of a pivoting hook, and the safety lock second element installed on the door is a stationary complementary pin element.

In the door-stowed position, the safety lock first element mounted on the fairing spar, once in engagement with the safety lock second element, is advantageously held fast in position by an automatic immobilizing mechanism which can be released only through a deliberate action on a control system independent of the actuation of the safety lock.

As indicated above, the pivoting of the doors is achieved by actuators, each door being coupled to an actuator, so that such an actuator itself constitutes a further safety lock for preventing the unwanted opening of the door by virtue of a locking means which it contains.

BRIEF DESCRIPTION OF THE DRAWINGS

Other features and advantages of the invention will emerge during the description of one embodiment of the invention given without limitation implied, with reference to the appended drawings in which.

DESCRIPTION OF THE PREFERRED EMBODIMENT

Figure 1:
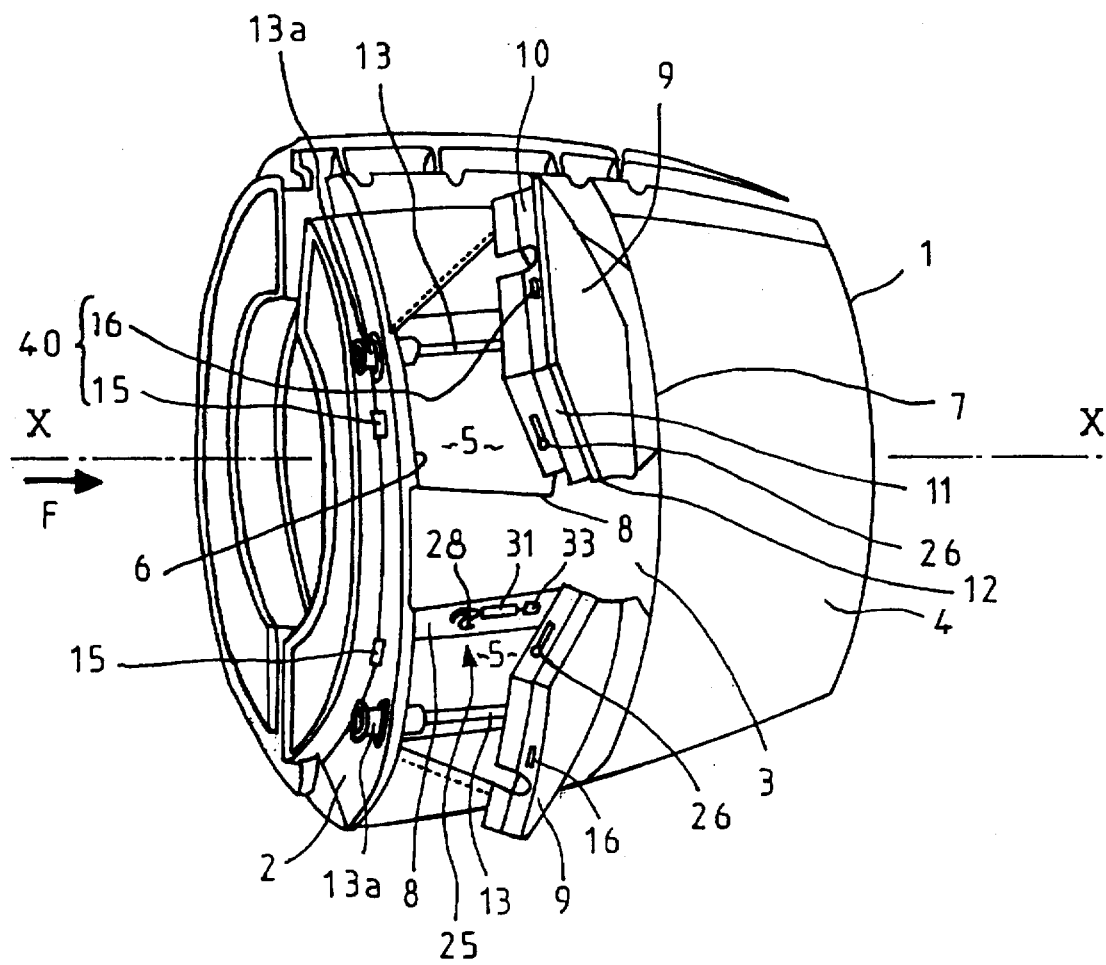
FIG. 1 is an overall perspective view of a fairing rear part for an aircraft engine equipped with a thrust reverser installation.

In FIG. 1, represented as 1 is the rear part of a fairing surrounding an engine (not represented), and as X—X is represented the longitudinal axis of said engine. This rear part 1 is made up of a stationary and rigid structure comprising an upstream (in the direction of flow of the gases from upstream to downstream, represented by the arrow F) annular frame 2; lateral spars 3; and an annular downstream shroud 4.

The stationary fairing structure is pierced with openings 5 delimited by the edge 6 of the frame 2, a rear cutout 7 and the lateral edge 8 of the spars 3. In these openings 5 are housed pivoting doors 9 of substantially rectangular shape comprising an upstream edge 10 and lateral edges 11. The doors are articulated onto the lateral spars 3 by pivots 12 mounted in the lateral edges 11 of the doors. Into the internal face of each door is coupled one of the ends of an operating actuator 13, the other end 13a of which is housed in the annular frame 2.

In the embodiment represented, each actuator 13 contains, at 14 (FIG. 2), a mechanism for locking the actuator in the retracted position corresponding to the stowed position, this locking mechanism, known per se, constituting a safety feature. This preferred layout is not, however, obligatory and in no way constitutes a limitation of the invention.

Each door 9 is provided with a primary or upstream lock 40 and of a safety or lateral lock 25. Each primary lock 40 is made of a hook 15 mounted on the internal face of the upstream frame 2 and of a complementary pin element 16 provided on the upstream edge 10 of the door. The primary lock 40 may be of any appropriate type and in particular of the type described and claimed in the abovementioned French Patent No. 2,683,860. These primary locks associated with the doors are operated by a hydraulic control system, the same system that operates the actuators 13.

Figure 2:
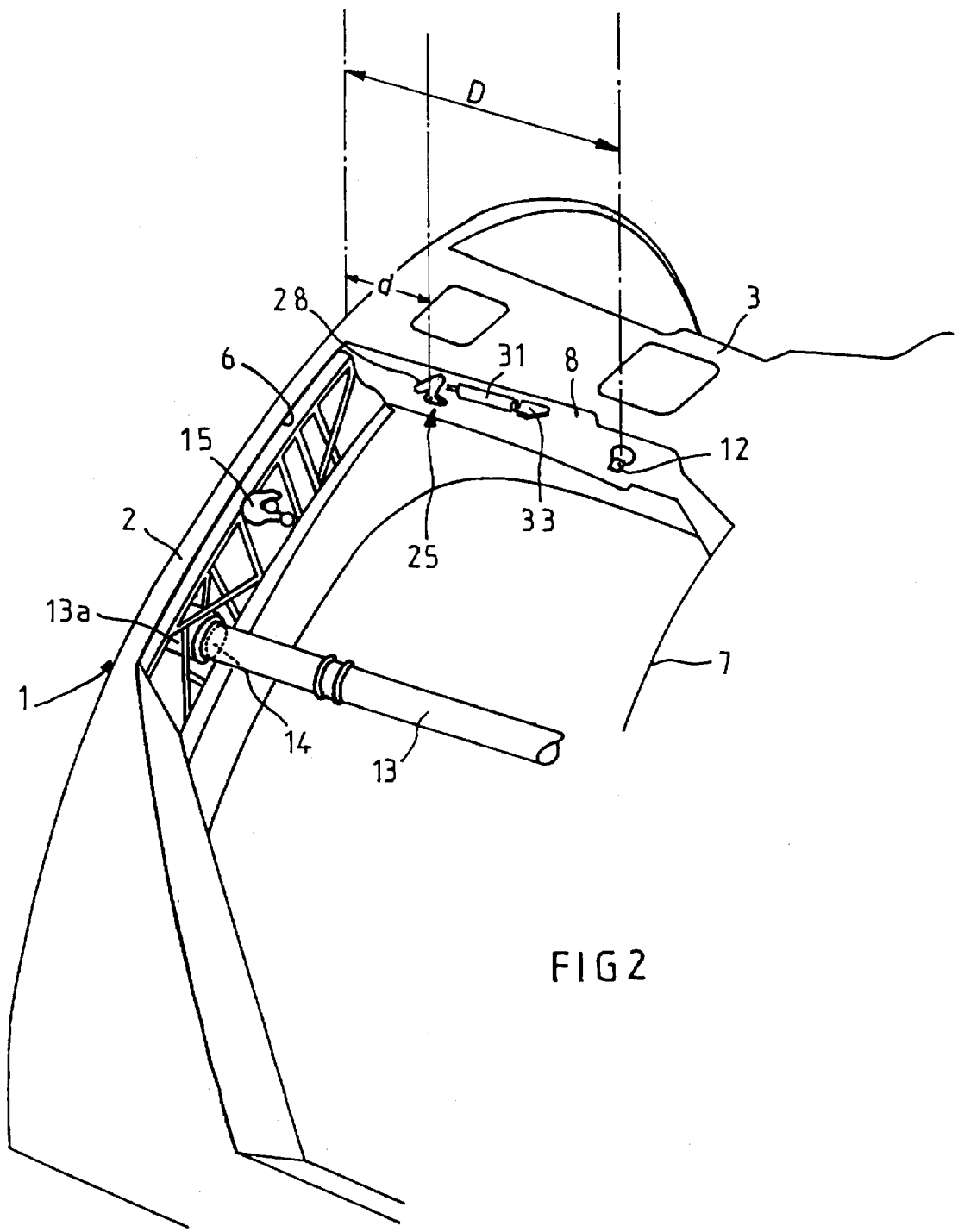
FIG. 2 is a detail on a larger scale of the opening for diverting the flow of propulsive gas of an engine equipped with the safety system of the invention.
Figure 3:
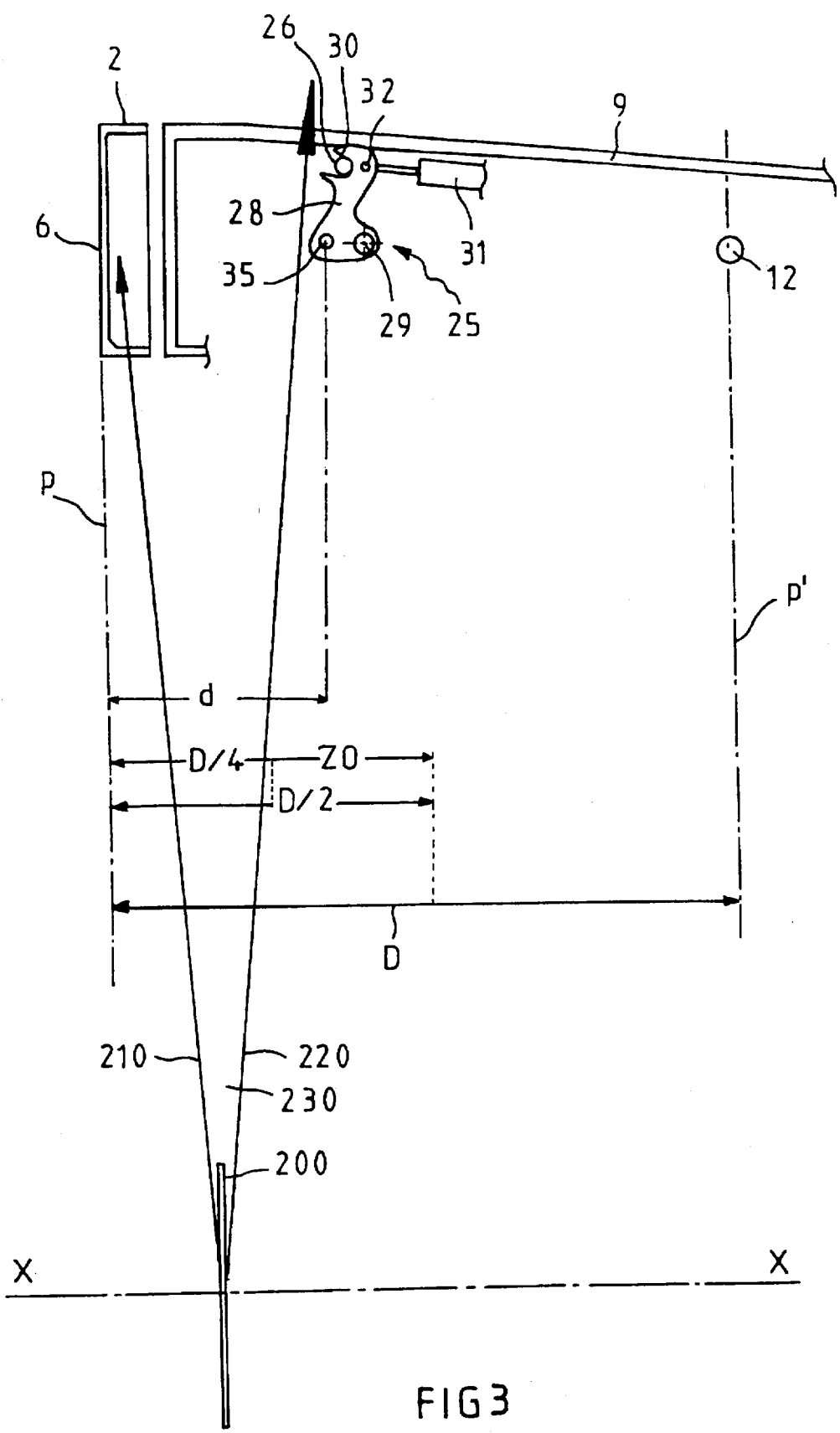
FIG. 3 is a diagram illustrating a disc rupture during the operation of the engine.

As is best seen in FIGS. 2 and 3, each safety lock 25 is made up of a hook 28 mounted on the spar 3 and of a pin 26 formed on the lateral edge 11 of the door 9. The hook 28 is articulated so that it pivots at 29 on a spindle integral with the lateral edge 8 of the spar. The cutout 30 of the hook is intended to engage with the pin 26 (FIG. 1), in order to keep the latter in the closed position.

The pivoting of the hook 28 for releasing the pin 26 in order to allow the door to be opened is permitted by virtue of a spring strut 31, the head of which is coupled to the hook at 32 and the tail of which is articulated to a support 33 (FIG. 2) integral with the edge 8.

Figure 5:
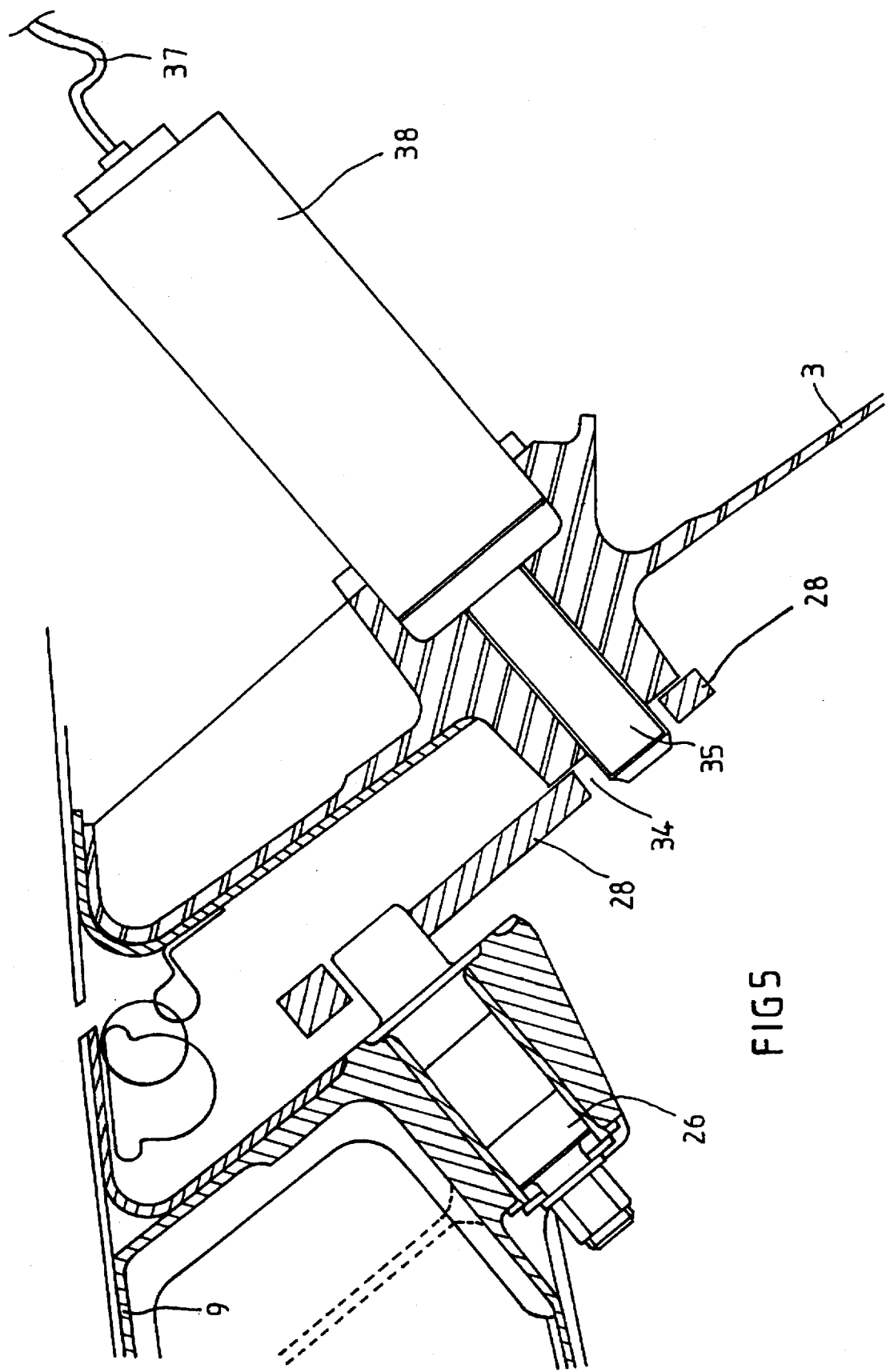
FIG. 5 is a cross-sectional view taken in the plane V—V of FIG. 4, on a larger scale.

A device for preventing the rotation of the hook is made up of a finger 35 intended to interact with a hole 34 in the hook and subjected to the action of a solenoid 38 (FIG. 5) and extending transversely to the plane of the hook 28, said finger being mounted permanently in the wall of the edge 8 of the opening 5. The electric control system 37 for the solenoid 38 for actuating the finger 35 is independent of the control circuit for the lock 40.

Figure 4:
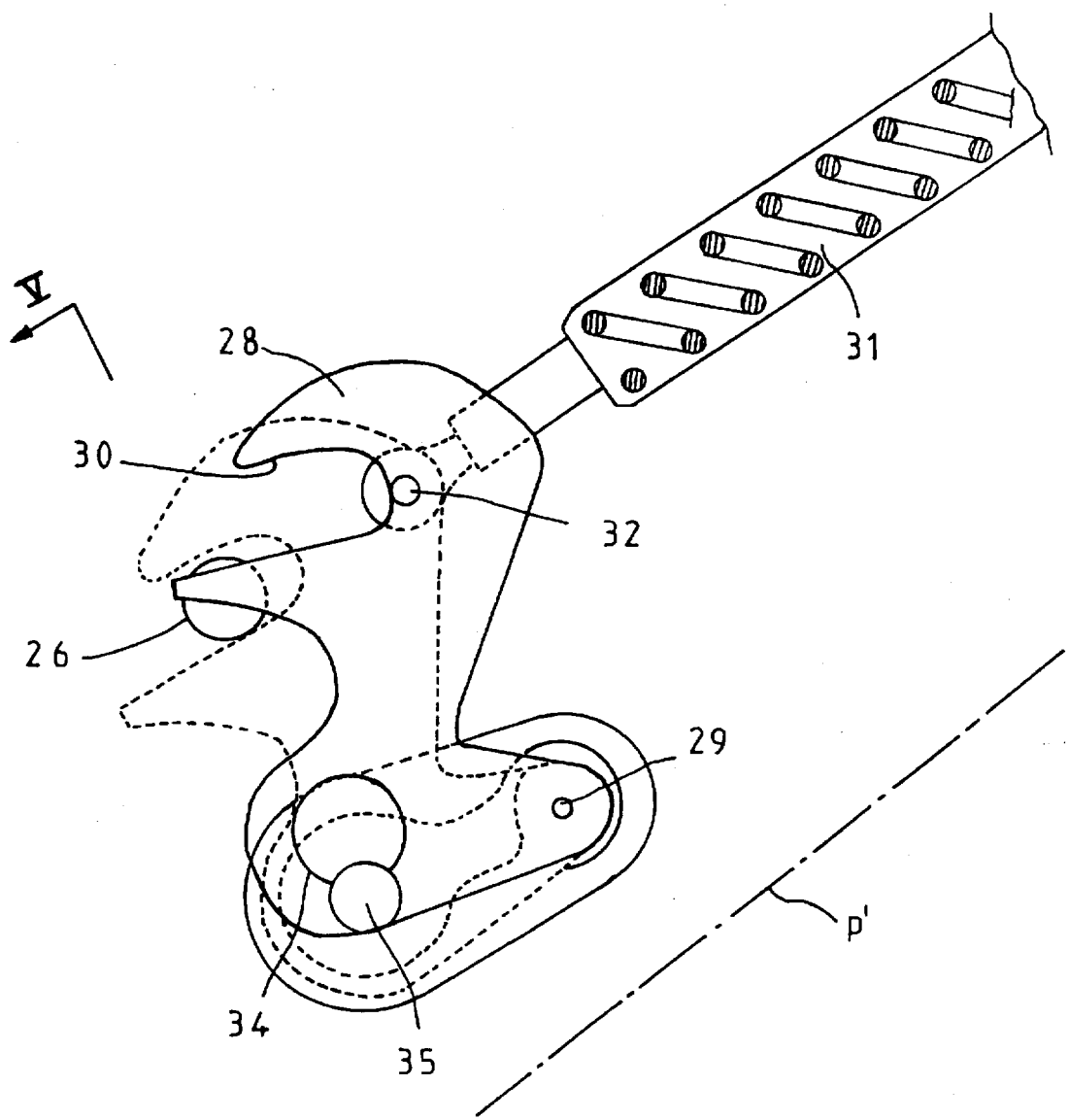
FIG. 4 is a detail on a larger scale of a preferred embodiment of a safety lock according to the invention.

The prevention finger 35 is permanently held by a spring (not represented) into the extended position and bears against the solid face of the hook 28 when the latter is in the open position (position in solid line of FIG. 4), which is the case when it is desired to release the door and to permit the opening thereof (deployed position). In contrast, as soon as the door closes back into the stowed position, the pin 26 hits and rotates the hook 28 into its position shown in broken line of FIG. 4, and as soon as the finger 35 comes to face the hole 34, it automatically penetrates into the hole under the action of its spring. The unlocking of the safety lock can then occur only if the solenoid associated with the finger 35 is deliberately actuated via its independent electric control system. It will be noted that by virtue of this arrangement, if the solenoid 38 (FIG. 5) cannot be actuated following, for example, the destruction of its electric control system, the hook 28 of the safety lock 25 remains immobilized by the finger 35 and cannot pivot under the action of the spring strut 31. The door 9 is thus prevented from being opened.

As seen in FIGS. 1 and 2, especially, the hook 28 of the safety lock 25 is located between the door pivot 12 and the annular frame 2 of the stationary structure. Likewise, the pin 26 of the safety lock 25 intended to engage with the hook 28 is situated between the door pivot 12 and the upstream edge of the door (see FIG. 1).

According to the preferred embodiment represented, the distance d (FIGS. 2 and 3) between the safety lock 25 and the edge 6 of the upstream frame 2 advantageously lies between half and a quarter of the distance "D" between the door pivot 12 and the edge 6 of the frame 2. The same is naturally true for the position of the pin 26 on the lateral door edge.

The choice of this position can be explained with reference to FIG. 3. In this diagram, X—X is used to represent the longitudinal axis of the engine, P represents the plane of the frame 2 of the stationary structure containing the tail of the actuators 13 and the primary locks 40 and P' represents the plane of the pivots. One of the discs of the turbine, which is made up of a great number of discs (not represented) located in series one after another, has been represented diagrammatically as 200.

As can be seen, this disc 200 is situated in the immediate proximity to the plane P. The arrows 210–220 represent the limits of the path area 230 which the disc 200 might have if it were to break and be thrown out against the fairing by centrifugal force. The angle between arrows 210 and 220 is the one generally recognized. In this example it can be seen that the frame and the primary locks 40 as well as the actuators 13 risk being damaged while the locks 25 will remain outside of the path. If the safety lock 25 was situated further forward, that is to say in the first quarter of the distance "D", it would also risk being damaged.

Of course, one might wish to move the safety locks 25 further back toward the pivot 12, but this is not desirable, because the closer one gets to the pivots 12, the more significant become the mechanical loads on the safety locks 25 which are due to the pressure exerted on the internal face of the door 9.

The favored position of the safety locks 25 in the region "Z0", situated between a half D/2 and a quarter D/4 upstream of the distance "D", therefore combines maximum safety, placing the safety locks 25 out of reach of damage, and optimum mechanical working conditions for the safety locks.

What we claim is:

1. A thrust-reversal installation with doors for an aircraft engine of the jet type, said installation comprising:
   (a) a stationary structure of a fairing surrounding the engine generally concentrically with a longitudinal axis of said engine, wherein the stationary fairing structure comprises an upstream (with respect to the direction of flow of propulsive gases) annular frame and longitudinal spars respectively delimiting the upstream and lateral edges of openings in the fairing,
   (b) a series of pivoting doors articulated about pivots in said stationary structure, said doors pivoting, under an action of a control actuator, between a non-obstructing stowed position in which said doors close off said openings, and a deployed position in which said doors project radially outward from the fairing, freeing said openings via which said flow of propulsive gases may be deflected radially outward, and
   (c) a door safety system preventing an inadvertent deployment of the reverser doors, the safety system comprising, for each door, at least a hydraulic primary lock and an independent safety lock, each made of a first and of a second elements which are mutually and releasably engageable, the two locks being separated from one another in the direction of the longitudinal axis of the engine and being associated respectively with systems for controlling the deployment and stowing of the doors, the deployment controlling systems being independent of one another, wherein said primary lock has its first lock element mounted on the upstream annular frame and its second lock element provided on the upstream edge of the door, while the safety lock has its first lock element in the shape of a pivoting hook mounted on one of the longitudinal spars and its second lock element in the shape of a stationary pin formed in the lateral edge of the door, in the door-closed position, the pivoting hook, once in engagement with the stationary pin, is held fast in position by an automatic immobilizing mechanism which is independent of the hook and is not permanently connected thereto and which can be released only through a deliberate action on an electric control system independent of the actuation of the hydraulic primary lock.

2. The reversal installation as claimed in claim 1, wherein the automatic immobilizing mechanism consists of a solenoid actuated finger interacting with a hole provided in said hook.

3. The reversal installation as claimed in claim 1, wherein the doors and the openings in the fairing in which the doors are housed have a substantially rectangular shape, and wherein the two locks are located respectively on two adjacent sides of each opening in the fairing.

4. The installation as claimed in claim 1, wherein the safety lock first elements mounted on the spars are situated in a space lying between the door pivots and the upstream annular frame.

5. The installation as claimed in claim 1, wherein the safety lock first elements mounted on the spars are situated in the space lying between the door pivots and the upstream annular frame, the distance between the safety lock first element and the upstream frame being less than or equal to half the distance between the upstream frame and the door pivots.

6. The installation as claimed in claim 1, wherein the safety lock first elements mounted on the spars are situated in a space lying between the door pivots and the upstream annular frame, the safety lock second elements being situated at a distance from the upstream frame which lies between half and a quarter of the distance between the upstream frame and the door pivots.

7. The installation as claimed in claim 1, wherein the safety lock second element associated with the door is situated on the lateral door edge at a distance from the upstream edge of the door which is equal to, or less than, half the distance between the upstream door edge and the door pivot.

8. The installation as claimed in claim 1, wherein the safety lock first elements mounted on the spars are situated in the space lying between the door pivots and the upstream annular frame, the safety lock first element being situated at a distance from the upstream frame which lies between half and a quarter of the distance between the upstream frame and the door pivots and the safety lock second elements being situated at a distance from the upstream door edge which lies between half and a quarter of the distance between the upstream edge and the door pivots.

9. The installation as claimed in claim 1, wherein the pivoting of the doors is achieved by actuators, each door being coupled to an actuator, wherein said actuator itself constitutes a further safety lock for preventing the inadvertent deployment of the door by virtue of a locking means which it contains.

10. A thrust-reversal installation with doors for an aircraft engine of the jet type, said installation comprising:
    (a) a stationary structure of a fairing surrounding the engine generally concentrically with a longitudinal axis of said engine, wherein the stationary fairing structure comprises an upstream (with respect to the direction of flow of propulsive gases) annular frame and longitudinal spars respectively delimiting the upstream and lateral edges of openings in the fairing,
    (b) a series of pivoting doors articulated about pivots in said stationary structure, said doors pivoting, under an action of a control actuator, between a non-obstructing stowed position in which said doors close off said openings, and a deployed position in which said doors project radially outward from the fairing, freeing said openings via which said flow of propulsive gases may be deflected radially outward, and
    (c) a door safety system preventing an inadvertent deployment of the reverser doors, the safety system comprising, for each door, at least a hydraulic primary lock and an independent safety lock, each made of a first and of a second elements which are mutually and releasably engageable, the two locks being separated from one another in the direction of the longitudinal axis of the engine and being associated respectively with systems for controlling the deployment and stowing of the doors, the deployment controlling systems being independent of one another, wherein said primary lock has its first lock element mounted on the upstream annular frame and its second lock element provided on the upstream edge of the door, while the safety lock has its first lock element in the shape of a pivoting hook mounted on one of the longitudinal spars and its second lock element in the shape of a stationary pin formed in the lateral edge of the door, in the door-closed position, the pivoting hook, once in engagement with the stationary pin, is held fast in position by an automatic immobilizing mechanism which is independent of the hook and is not permanently connected thereto and which can be released only through a deliberate action on an electric control system independent of the actuation of the hydraulic primary lock, and wherein the automatic immobilizing mechanism consists of a solenoid actuated finger interacting with a hole provided in said hook.

11. The reversal installation as claimed in claim 10, wherein the doors and the openings in the fairing in which the doors are housed have a substantially rectangular shape, and wherein the two locks are located respectively on two adjacent sides of each opening in the fairing.

12. The installation as claimed in claim 10, wherein the safety lock first elements mounted on the spars are situated in a space lying between the door pivots and the upstream annular frame.

13. The installation as claimed in claim 10, wherein the safety lock first elements mounted on the spars are situated in the space lying between the door pivots and the upstream annular frame, the distance between the safety lock first element and the upstream frame being less than or equal to half the distance between the upstream frame and the door pivots.

14. The installation as claimed in claim 10, wherein the safety lock first elements mounted on the spars are situated in a space lying between the door pivots and the upstream annular frame, the safety lock second elements being situated at a distance from the upstream frame which lies between half and a quarter of the distance between the upstream frame and the door pivots.

15. The installation as claimed in claim 10, wherein the safety lock second element associated with the door is situated on the lateral door edge at a distance from the upstream edge of the door which is equal to, or less than, half the distance between the upstream door edge and the door pivot.

16. The installation as claimed in claim 10, wherein the safety lock first elements mounted on the spars are situated in the space lying between the door pivots and the upstream annular frame, the safety lock first element being situated at a distance from the upstream frame which lies between half and a quarter of the distance between the upstream frame and the door pivots and the safety lock second elements being situated at a distance from the upstream door edge which lies between half and a quarter of the distance between the upstream edge and the door pivots.

17. The installation as claimed in claim 10, wherein the pivoting of the doors is achieved by actuators, each door being coupled to an actuator, wherein said actuator itself constitutes a further safety lock for preventing the inadvertent deployment of the door by virtue of a locking means which it contains.

* * * * *